(12) United States Patent
Oku et al.

(10) Patent No.: US 8,184,665 B2
(45) Date of Patent: May 22, 2012

(54) NETWORK DEVICE

(75) Inventors: Tatsuya Oku, Kawasaki (JP); Yasuo Takami, Kawasaki (JP); Masato Hashizume, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 409 days.

(21) Appl. No.: 12/627,017

(22) Filed: Nov. 30, 2009

(65) Prior Publication Data
US 2010/0172370 A1 Jul. 8, 2010

(30) Foreign Application Priority Data

Jan. 7, 2009 (JP) ................................. 2009-001477

(51) Int. Cl.
*H04J 3/06* (2006.01)
(52) U.S. Cl. .................... 370/512; 370/509; 370/511
(58) Field of Classification Search .................. 370/512, 370/509, 503; 375/350, 354, 356
See application file for complete search history.

(56) References Cited

U.S. PATENT DOCUMENTS

| | | | |
|---|---|---|---|
| 5,990,858 A * | 11/1999 | Ozolins | 345/99 |
| 6,041,066 A * | 3/2000 | Meki et al. | 370/512 |
| 7,020,444 B2 | 3/2006 | Shinbo et al. | |
| 2009/0253382 A1 * | 10/2009 | Haralabidis et al. | 455/73 |
| 2010/0008384 A1 * | 1/2010 | Hamasaki | 370/503 |

FOREIGN PATENT DOCUMENTS

| | | |
|---|---|---|
| JP | H05-14760 A | 1/1993 |
| JP | 2004-112750 A | 4/2004 |

* cited by examiner

*Primary Examiner* — Huy D Vu
*Assistant Examiner* — Omer Mian
(74) *Attorney, Agent, or Firm* — Fujitsu Patent Center

(57) ABSTRACT

A disclosed network device includes a plurality of interface cards that receive clock signals and clock signal quality information from other devices via communication lines, respectively being predetermined communication line types corresponding to the plurality of interface cards, a controller that acquires the clock signal quality information and determines one of the clock signals having a highest quality based on this, and a clock processor that generates a synchronization clock signal used for network synchronization the clock processor, based on the determined one of the clock signals, whereby the clock processor includes a frequency measuring instrument that measures a frequency component of the one of the clock signals, and determines the communication line type corresponding to one of the interface cards, and a clock controller that provides a coefficient to a digital filter based on the determined communication line type.

18 Claims, 27 Drawing Sheets

FIG.1

| SONET NAME | SDH NAME | TRANSMISSION RATE | PAYLOAD |
|---|---|---|---|
| OC-1 | STM-0 | 51.84 Mbps | 49.536 Mbps |
| OC-3 | STM-1 | 155.52 Mbps | 149.76 Mbps |
| OC-12 | STM-4 | 622.08 Mbps | 599.04 Mbps |
| OC-48 | STM-16 | 2.48832 Gbps | 2.39616 Gbps |
| OC-192 | STM-64 | 9.95328 Gbps | 9.58464 Gbps |

FIG.4

| FRAME NO. | Fbit | | |
|---|---|---|---|
| | FE | CRC | DataLink |
| 0 | — | — | m |
| 1 | — | E1 | — |
| 2 | — | — | m |
| 3 | 0 | — | — |
| 4 | — | — | m |
| 5 | — | E2 | — |
| 6 | — | — | m |
| 7 | 0 | — | — |
| 8 | — | — | m |
| 9 | — | E3 | — |
| 10 | — | — | m |
| 11 | 1 | — | — |
| 12 | — | — | m |
| 13 | — | E4 | — |
| 14 | — | — | m |
| 15 | 0 | — | — |
| 16 | — | — | m |
| 17 | — | E5 | — |
| 18 | — | — | m |
| 19 | 0 | — | — |
| 20 | — | — | m |
| 21 | — | E6 | — |
| 22 | — | — | m |
| 23 | 1 | — | — |

FIG.5

| FRAME NO. | Fbit | |
| --- | --- | --- |
| | FS | FT |
| 0 | — | |
| 1 | | — |
| 2 | — | |
| 3 | | — |
| 4 | — | |
| 5 | | — |
| 6 | — | |
| 7 | | — |
| 8 | — | |
| 9 | | — |
| 10 | — | |
| 11 | | — |

FIG.6A

| Bit Number Alternate frames | 0 | 1 | 2 | 3 | 4 | 5 | 6 | 7 |
|---|---|---|---|---|---|---|---|---|
| Frame containing the alignment signal | Si | 0 | 0 | 1 | 1 | 0 | 1 | 1 |
| Frame not containing the frame alignment signal | Si | 1 | A | Sa4 | Sa5 | Sa6 | Sa7 | Sa8 |

FIG.6B

| Frame Number | Bit0 | Bit1 | Bit2 | Bit3 | Bit4 | Bit5 | Bit6 | Bit7 |
|---|---|---|---|---|---|---|---|---|
| 0 | C1 | 0 | 0 | 1 | 1 | 0 | 1 | 1 |
| 1 | 0 | 1 | A | Sa41 | Sa51 | Sa61 | Sa71 | Sa81 |
| 2 | C2 | 0 | 0 | 1 | 1 | 0 | 1 | 1 |
| 3 | 0 | 1 | A | Sa42 | Sa52 | Sa62 | Sa72 | Sa82 |
| 4 | C3 | 0 | 0 | 1 | 1 | 0 | 1 | 1 |
| 5 | 0 | 1 | A | Sa43 | Sa53 | Sa63 | Sa73 | Sa83 |
| 6 | C4 | 0 | 0 | 1 | 1 | 0 | 1 | 1 |
| 7 | 0 | 1 | A | Sa44 | Sa54 | Sa64 | Sa74 | Sa84 |
| 8 | C1 | 0 | 0 | 1 | 1 | 0 | 1 | 1 |
| 9 | 1 | 1 | A | Sa41 | Sa51 | Sa61 | Sa71 | Sa81 |
| 10 | C2 | 0 | 0 | 1 | 1 | 0 | 1 | 1 |
| 11 | 1 | 1 | A | Sa42 | Sa52 | Sa62 | Sa72 | Sa82 |
| 12 | C3 | 0 | 0 | 1 | 1 | 0 | 1 | 1 |
| 13 | E | 1 | A | Sa43 | Sa53 | Sa63 | Sa73 | Sa83 |
| 14 | C4 | 0 | 0 | 1 | 1 | 0 | 1 | 1 |
| 15 | E | 1 | A | Sa44 | Sa54 | Sa64 | Sa74 | Sa84 |

FIG.7A

| Description | Acronym | Quality Level | DS1 ESF Data Link Code Word[a] | S1 bits 5678[b] |
|---|---|---|---|---|
| Stratum 1 Traceable | PRS | 1 | 00000100 11111111 | 0001 |
| Synchronized-Traceability Unknown | STU | 2 | 00001000 11111111 | 0000[c] |
| Stratum 2 Traceable | ST2 | 3 | 00001100 11111111 | 0111 |
| Transit Node Clock Traceable[d] | TNC | 4 | 01111000 11111111 | 0100 |
| Stratum 3E Traceable[d] | ST3E | 5 | 01111100 11111111 | 1101 |
| Stratum 3 Traceable | ST3 | 6 | 00010000 11111111 | 1010 |
| SONET Minimum Clock Traceable | SMC | 7 | 00100010 11111111 | 1100 |
| Stratum 4 Traceable | ST4 | 8 | 00101000 11111111 | N/A |
| DON'T USE for Synchronization | DUS | 9 | 00110000 11111111 | 1111 |
| Provisionable by the Network Operator[e] | PNO | user assignable | 01000000 11111111 | 1110 |

| COMMUNICATION LINE TYPE | EXTRACTED CLOCK RATE |
|---|---|
| SONET/SDH | 12.96 MHz |
| PDH(ANSI) | 1.544 MHz |
| PDH(ETSI) | 2.048 MHz |
| Ethernet(10/100ME) | 25 MHz |
| Ethernet(1GE) | 100 MHz |
| Ethernet(10GE) | 125 MHz |

FIG.12

| Data #1 | Data #2 | Data #3 | Data #4 | Data #5 |
|---|---|---|---|---|
| COMMUNICATION LINE TYPE INFORMATION | FREQUENCY INFORMATION | FREQUENCY DEVIATION INFORMATION | REQUISITE CHARACTERISTIC INFORMATION | OTHERS |

FIG.14

| COMMUNICATION LINE TYPE | EXTRACTED CLOCK RATE | FREQUENCY DIVIDING RATIO | REFERENCE FREQUENCY |
|---|---|---|---|
| SONET/SDH | 12.96 MHz | 1620 | 8 KHz |
| PDH(ANSI) | 1.544 MHz | 193 | 8 KHz |
| PDH(ETSI) | 2.048 MHz | 256 | 8 KHz |
| Ethernet(10/100ME) | 25 MHz | 3125 | 8 KHz |
| Ethernet(1GE) | 100 MHz | 12500 | 8 KHz |
| Ethernet(10GE) | 125 MHz | 15625 | 8 KHz |

FIG.15

| COMMUNICATION LINE TYPE | TARGET CUTOFF FREQUENCY (Hz) | TARGET LOCKING TIME (sec) | TARGET DAMPING FACTOR | FILTER PARAMETER $\alpha$ | FILTER PARAMETER $\beta$ |
|---|---|---|---|---|---|
| SONET/SDH | xxx | xxx | xxx | $\alpha_1$ | $\beta_1$ |
| PDH(ANSI) | xxx | xxx | xxx | $\alpha_2$ | $\beta_2$ |
| PDH(ETSI) | xxx | xxx | xxx | $\alpha_3$ | $\beta_3$ |
| Ethernet(10/100ME) | xxx | xxx | xxx | $\alpha_4$ | $\beta_4$ |
| Ethernet(1GE) | xxx | xxx | xxx | $\alpha_5$ | $\beta_5$ |
| Ethernet(10GE) | xxx | xxx | xxx | $\alpha_6$ | $\beta_6$ |

FIG.17

| Data #1 | Data #2 | Data #3 | Data #4 | Data #5 |
|---|---|---|---|---|
| FILTER PARAMETER α | FILTER PARAMETER β | CUTOFF FREQUENCY | DAMPING FACTOR | OTHERS |

FIG.19

| Data #1 | Data #2 | Data #3 |
|---|---|---|
| COMMUNICATION LINE TYPE | LOCKING TIME | CUTOFF FREQUENCY |

FIG.21

| Data #1z | Data #2 |
|---|---|
| LOCKING TIME | CUTOFF FREQUENCY |

FIG.25

| Data #1 | Data #2 | Data #3 | Data #4 | Data #5 |
|---|---|---|---|---|
| COMMUNICATION TYPE INFORMATION | FREQUENCY INFORMATION | FREQUENCY DEVIATION INFORMATION | MISS-MOUNT INFORMATION | OTHERS |

# NETWORK DEVICE

CROSS-REFERENCE TO RELATED APPLICATIONS

This patent application is based upon and claims the benefit of priority of the prior Japanese Patent Application No. 2009-001477 filed on Jan. 7, 2009, the entire contents of which are incorporated herein by reference.

FIELD

The embodiments discussed herein are related to a network device.

BACKGROUND

A communication semiconductor integrated circuit that has an oscillator circuit forming part of a transmission PLL circuit fabricated on a single semiconductor chip together with an oscillator circuit forming part of a reception PLL circuit and an oscillator circuit for an intermediate frequency is known. The oscillator circuit for the transmission PLL circuit is configured to be operable in a plurality of bands.

The communication semiconductor integrated circuit also includes a circuit for measuring the oscillating frequency of the oscillator circuit for the transmission PLL circuit, and a storage circuit for storing the result of measurement made by the measuring circuit.

A judging part that stores the data of a frequency measuring part, polarity judging part, and pulse width measuring part of a horizontal synchronizing signal, and the data of a frequency measuring part, polarity judging part, and pulse width measuring part of a vertical synchronizing signal in the ROM table of a microcomputer is known. The data are compared with the measured data, and the kind of the equipment in which the entire data are equal is judged as that of the signal source connected at present.

Then, the frequency division is operated by the frequency-division ratio corresponding to the signal source. And also, a PLL circuit is constituted of a phase comparator, a loop filter, and a voltage control type oscillator, and the clock signal corresponding to the signal source is reproduced. Thus, the switching of the frequency-division ratio is automatically operated, and the regeneration of the clock signal is simplified and quickened.

[Patent Document 1] Japanese Laid-open Patent Publication No. 2004-112750
[Patent Document 2] Japanese Laid-open Patent Publication No. 05-14760

SUMMARY

According to an aspect of the embodiment, a network device includes a plurality of interface cards that receive clock signals and clock signal quality information from other devices via communication lines, the communication lines being predetermined communication line types corresponding to the plurality of interface cards, respectively, a controller that acquires the clock signal quality information from the plurality of interface cards and determines one of the clock signals having a highest quality based on the clock signal quality information, and a clock processor that generates a synchronization clock signal used for network synchronization with a DPLL circuit, which is included in the clock processor, based on the determined one of the clock signals, whereby the clock processor includes a frequency measuring instrument that measures a frequency component of the one of the clock signals, and determines the communication line type corresponding to one of the plurality of interface cards receiving the determined one of the clock signals; and a clock controller that provides a coefficient to a digital filter included in the DPLL circuit based on the determined communication line type.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

Additional objects and advantages of the embodiments will be set forth in part in the description which follows, and in part will be obvious from the description, or may be learned by practice of the invention.

BRIEF DESCRIPTION OF THE DRAWINGS

FIG. 1 illustrates transmission rates of SONET or SDH;
FIG. 4 illustrates a frame structure of EES (24MF mode) of PDH (DS1);
FIG. 5 illustrates a frame structure of SF (12MF mode) of PDH (DS1);
FIG. 6A illustrates a frame structure of PDH (E1);
FIG. 6B illustrates a frame structure of PDH (E1);
FIG. 7A schematically illustrates a clock selection using the S1 byte of SONET or SDH;
FIG. 11 illustrates an example of an interface card information table;
FIG. 12 illustrates an example of a data structure of measured results;
FIG. 14 illustrates an example of frequency dividing setup;
FIG. 15 illustrates an example of filter parameter setup;
FIG. 17 illustrates an example of setup information sent from a digital signal processing unit to a digital filter setup unit;
FIG. 19 illustrates an example of reported information sent from a digital signal processing unit to a controller;
FIG. 21 illustrates an example of an instruction sent from a controller to a digital signal processing unit;
FIG. 25 illustrates an example of information notified from a frequency measuring instrument through a digital signal processing unit to a controller.

DESCRIPTION OF EMBODIMENTS

The embodiments relate to a network device having plural interface cards compliant with a predetermined communication line such as Synchronous Optical Network (SONET), Synchronous Digital Hierarchy (SDH), and Asynchronous Transfer Mode (ATM).

Synchronous Optical Network (SONET) and Synchronous Digital Hierarchy (SDH) have fixed transmission rates as illustrated in FIG. 1 and are configured to have a digital hierarchy structures. The abbreviation "SONET" is mainly used in North America, and the abbreviation "SDH" is mainly used in Europe. SONET and SDH can be compared as in FIG. 1.

Figure 2:
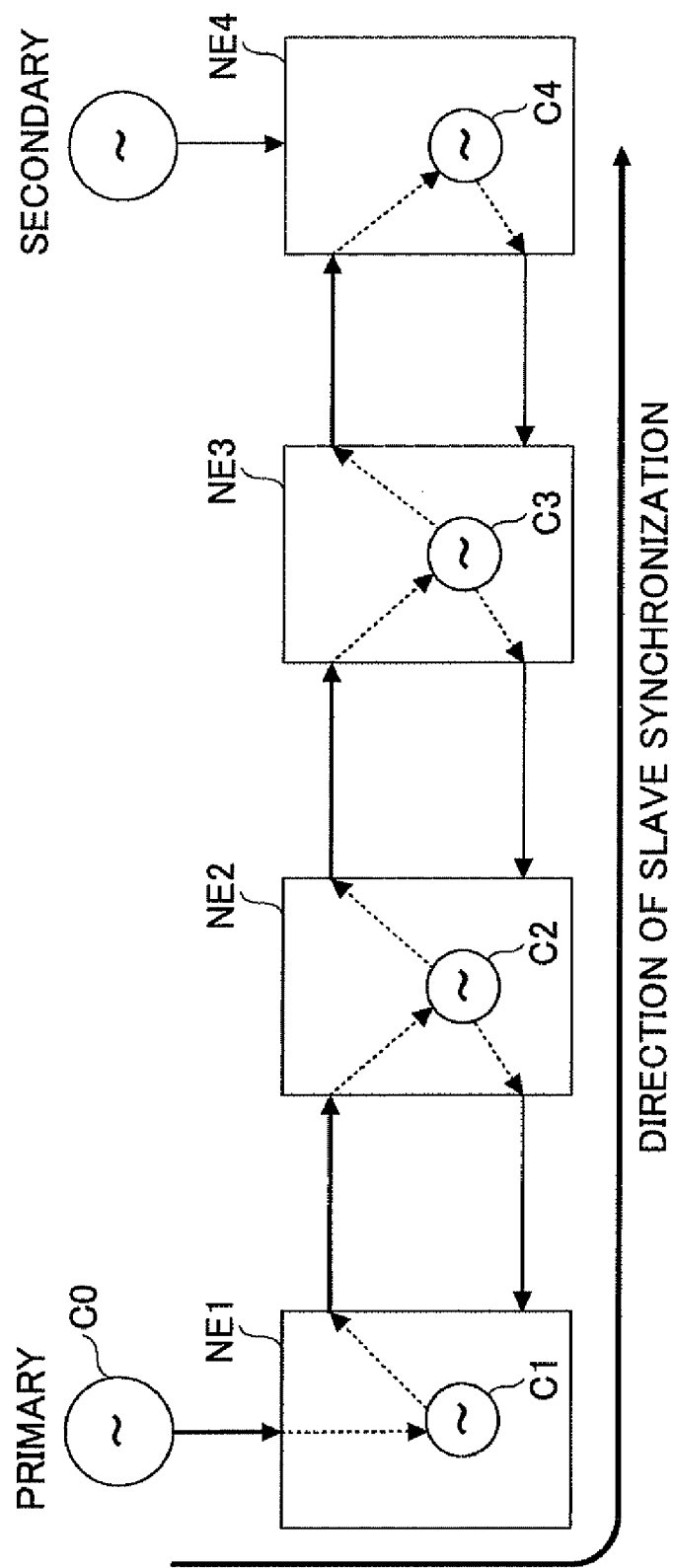
FIG. 2 schematically illustrates network synchronization.

Typically, in a network of SONET or SDH, clock for the communication line is dependently synchronized under network synchronization. FIG. 2 is a view schematically illustrating network synchronization. Arrows designate directions of slave synchronization. A network device NE1 receives a clock signal C0, generates a clock signal C1 with a digital phase locked loop (DPLL) circuit, and uses the clock signal C1 in a communication line to a network device NE2. The network device NE2 extracts the clock signal C1 from the communication line from the network device NE1 and generates a clock signal C2 with a DPLL circuit provided in the network device NE2, and uses the clock signal C2 for a communication line to a network device NE3 and a communication line to the network device NE1. In a similar manner, the network device NE3 extracts the clock signal C2 from the communication line from the network device NE2, generates a clock signal C3 with a DPLL circuit provided in the network device NE3, and uses the clock signal C3 for a communication line to the network device NE2 and a communication line to a network device NE4. The network device NE4 extracts the clock signal C3 from the communication line from the network device NE3, generates a clock signal C4 by a DPLL circuit provided in the network device NE4, and uses the clock signal C4 for a communication line to the network device NE3.

Ordinarily, plural other network devices are connected to a network device to form a network. An S1 byte of OH bytes in SONET or SDH stores clock quality information and is transmitted inside the network. The clock quality information is used in selecting the clock signal for the network. The overhead (OH) byte is a generic name of a region transferring operation and maintenance information to a sophisticated network operation.

The S1 byte stores a Synchronization Status Message (SSM). ATM is a code and standard of an optical transmission mode of SDH and mapped as an ATM cell in a payload of ATM. Therefore, its clock is similar to that in SONET or SDH.

Typical examples of an interface for supplying a clock are a DS1 frame in North America and a plesiochronous digital hierarchy (PDH) interface using an E1 frame in Europe, in addition to an interface card of SONET or SDH. These DS1 frames and E1 frames have a synch status message byte (SSMB) to be used to transmit clock signal quality like the S1 byte of SONET or SDH.

Figure 3:
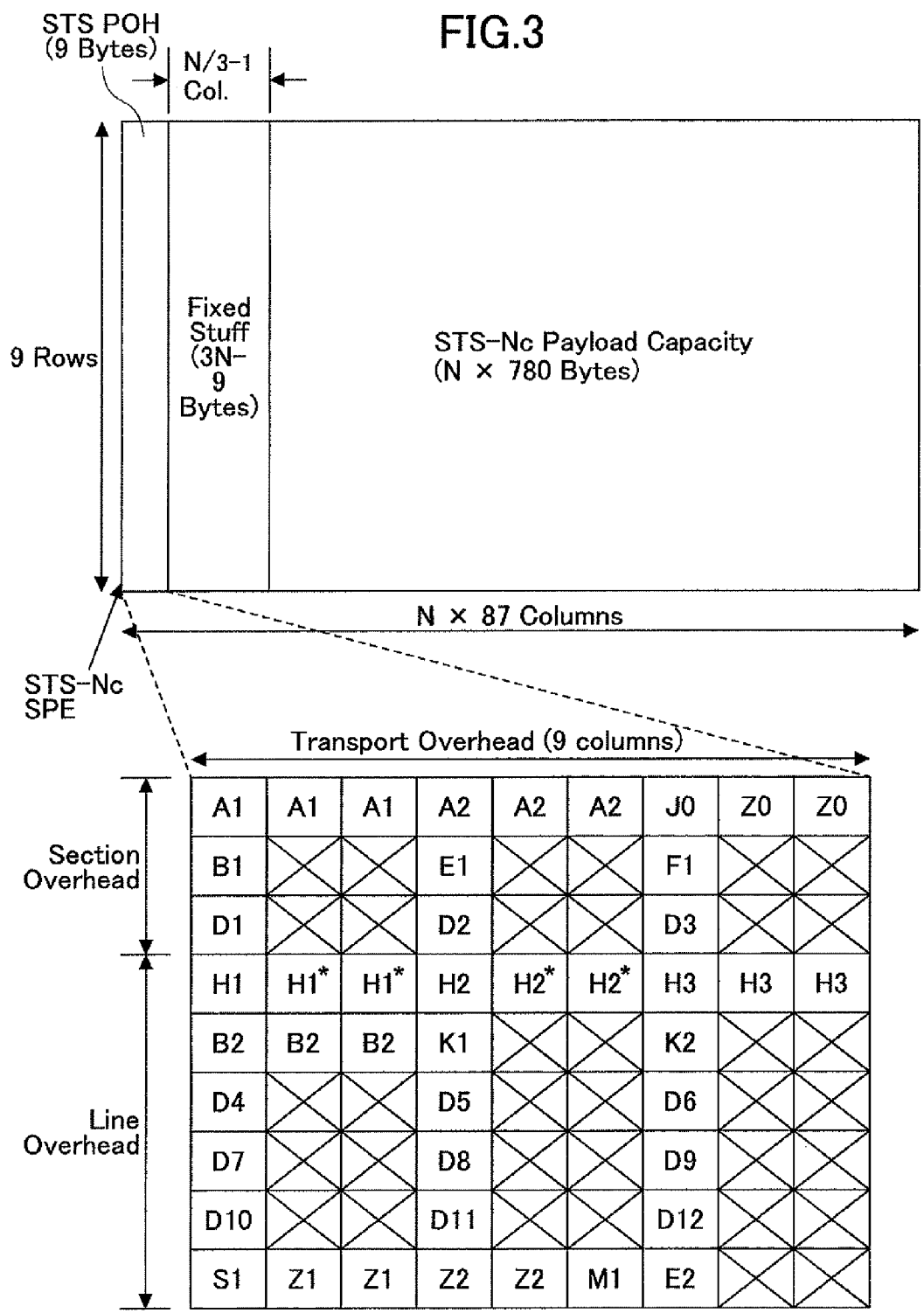
FIG. 3 illustrates a format of SONET or SDH.

FIG. 3 illustrates a SONET or SDH format. The S1 byte is included in OH byte (STSPOH).

The DS1 frame is an ANSI standard for a digital stage 1 signal format used mainly in North America. The DS1 frame of PDH is configured of frames of 193 bits per frame at a transmission rate of 8 kHz. The first bit of the frame is referred to as an F bit and has frame information and maintenance and monitoring information, for example.

Octets TS0 through TS23 subsequent to the F bit store user data. The interface includes two types of multi frames, 24MF (ESF) and 12MF (SF).

Figure 5:
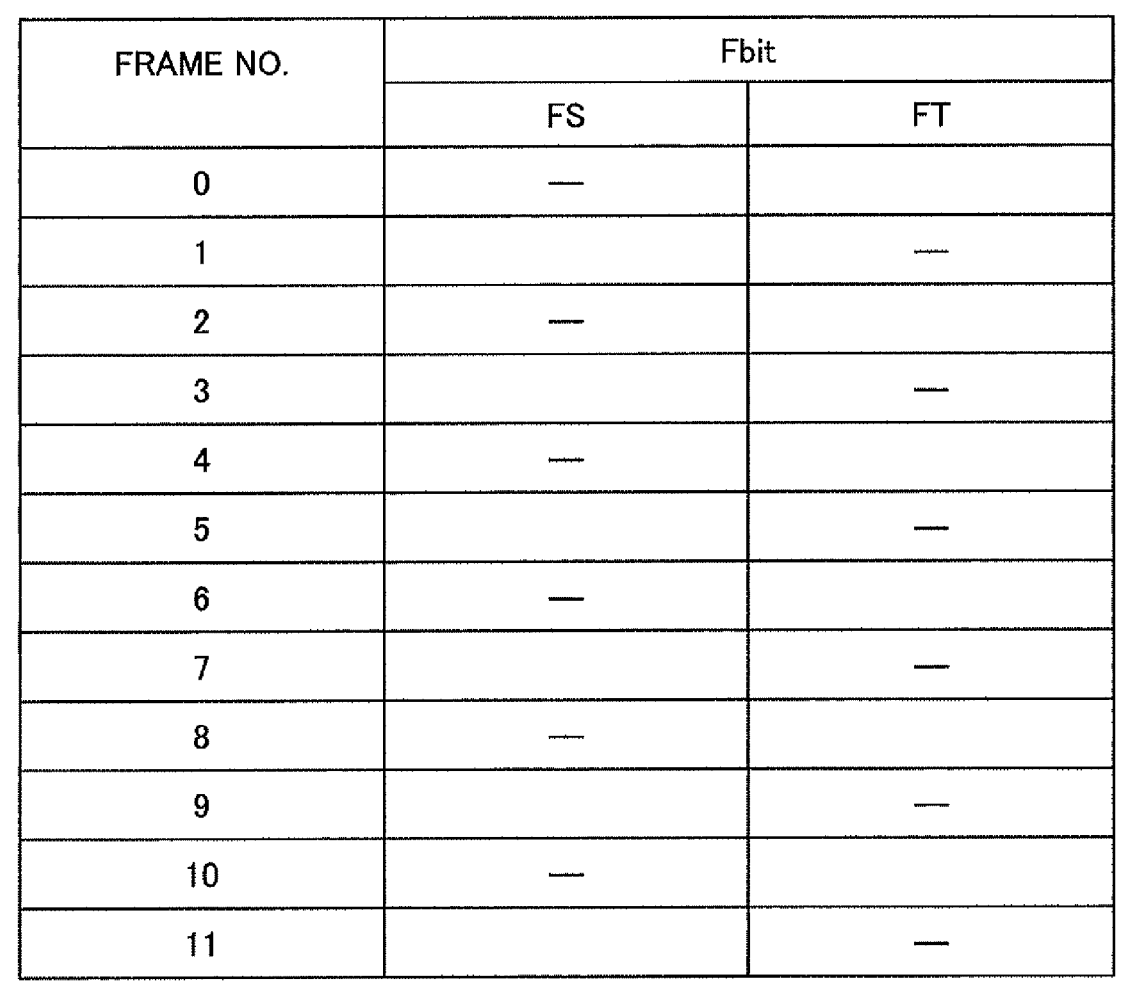

FIG. 4 illustrates a frame structure of EES (24MF mode) of PDH (DS1). A message of the S1 byte is included in the datalink of ESF. 12MF(SF) does not include information corresponding to the S1 byte (set assumed). FIG. 5 illustrates a frame structure of SF (12MF mode) of PDH (DS1).

The E1 frame of ETS1 mainly used in Europe is configured of frames of 256 bits per frame as a transmission rate of 8 kHz. Octets from a first bit (F bit) of a frame are called "TS0" through "TS31". TS0 includes frame information and maintenance and monitoring information. TS1 through T31 store user data. TS16 is called a signaling channel and stores allocation information of the user data. Two types of interfaces one having a multi-frame structure and one not having the multi-frame structure are defined in the interface. FIG. 6A illustrates a PDH(E1) frame structure having a multi-frame structure. FIG. 6B illustrates a PDH(E1) frame structure without having a multi-frame structure.

Figure 7B:
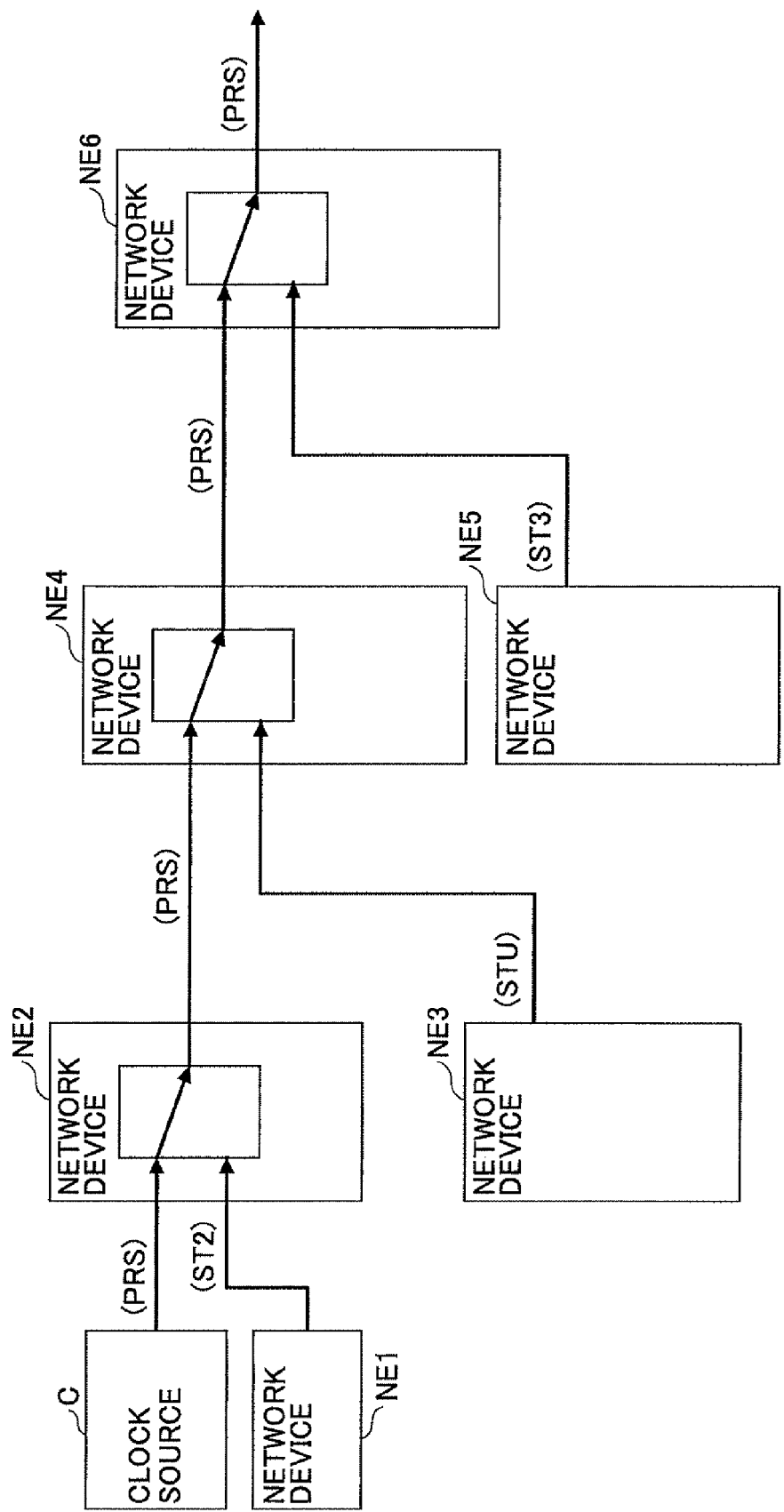
FIG. 7B schematically illustrates a clock selection using the S1 byte of SONET or SDH.

FIGS. 7A and 7B schematically illustrate a clock selection using the S1 byte of SONET or SDH. For example, the S1 byte includes an acronym and a quality Level in it. The highest quality level is represented by the Acronym "PRS" as illustrated in FIG. 7B.

Referring to FIG. 7B, The network device NE2, to which the clock source C and the network device NE1 are connected, selects a clock signal from the clock source C having a higher quality. The quality level of a clock signal of a communication line from the network device NE2 to a network device on a latter stage becomes "PRS". In a similar manner, there is a network device NE4, to which the network device NE2 having the quality level "PRS" and a network device NE3 having a quality level "STU" are connected. The network device NE4 selects a clock signal from the network device NE2 having a higher quality. Thus, a quality level of a clock signal of a communication line from the network device NE4 to a network device on a latter stage becomes "PRS". In a similar manner similar, there is a network device NE6, to which the network device NE4 having the quality level "PRS" and a network device NE5 having a quality level "ST3" are connected. The network device NE6 selects a clock signal from the network device NE4 having a higher quality. A quality level of a clock signal of a communication line from the network device NE6 to a network device on a latter stage becomes "PRS".

A network synchronization in SONET or SDH is carried out as described. Multiplexing under network synchronization requires a synchronizing clock. Clock signals used in a network are the same and preferably high quality.

There is a case where such the network device is connected to a so-called Ethernet, i.e. a commonly used local area network (LAN). Ethernet is used in a physical layer and a data link layer in Open System Interconnection (OSI) reference model. Ethernet is a standard for LANs. A specification of Ethernet is opened to the public as IEEE 802.3 and an extended edition of IEEE 802.3 by Institute of Electrical and Electronics Engineers (IEEE).

The quality of clock signals in Ethernet is not good and the clock signals may contain unwanted jitter and unwanted wander. Jitter is fluctuation generated in a signal due to a delay of the signal along a time axis. Wander resembles the jitter and is a long term change of a digital waveform from a first transmitted waveform.

Therefore, it is difficult to directly connect Ethernet to a synchronized network by unifying clock signals. This is because a digital phase-locked loop (DPLL) circuit generating an extracted clock signal, which is received from an interface card as a reference clock signal in a network device is tuned for obtaining a high quality clock signal for SONET or SDH but not for obtaining an ordinary quality clock signal for Ethernet. It is also possible to set parameters for the filter by substantially lowering a cutoff frequency of the DPLL circuit and enhancing filtering accuracy for the purpose of suppressing jitter and wander. However, in this case, there is a trade-off the filtering accuracy and a locking time until the DPLL finishes pull-in of the clock signal for directly connecting Ethernet to the synchronized circuit. A locking time of a clock signal for SONET or SDH becomes long enough to degrade efficiency of transmitting data.

When Ethernet is connected to a network device compliant with Ethernet, received data are first buffered using a memory and taken into a synchronized network. Because such a process is based on a so-called best effort allowing some error, data may be lost. One measure for preventing these errors is to directly take data into a synchronized network which enables all data transmissions one bit by one bit.

Meanwhile, in Japanese Laid-open Patent Publication No. 2004-112750 and Japanese Laid-open Patent Publication No. 05-14760, improvement technologies for a PLL circuit are disclosed.

However, the improvement technologies are not directed to a synchronized network for SONET or SDH, described above. Therefore, the above-mentioned problems cannot be solved.

Preferred embodiments of the present invention will now be explained with reference to accompanying drawings.

First Embodiment

<Device Configuration>

Figure 8:
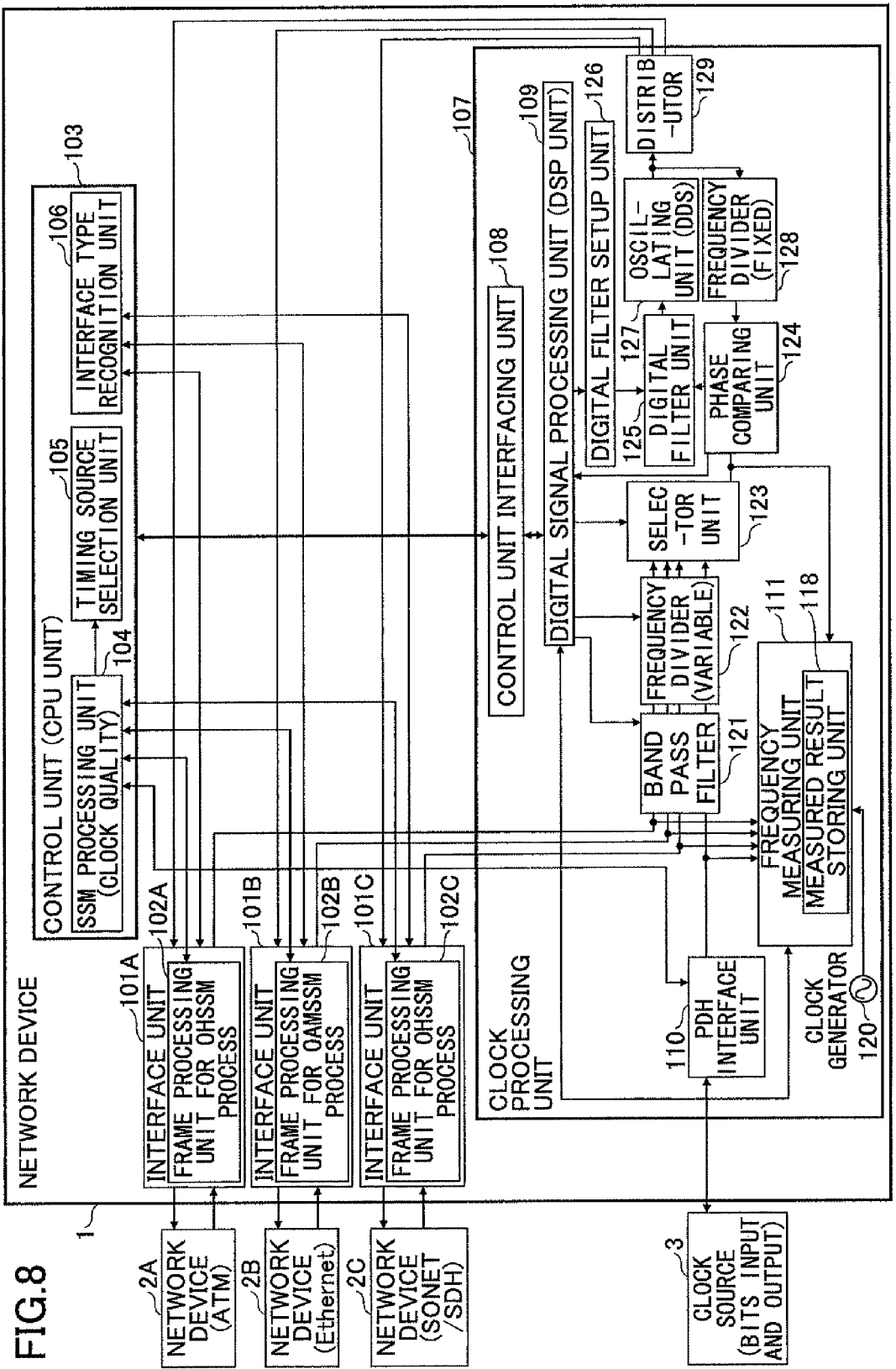
FIG. 8 illustrates a configuration example of a network device of an embodiment.

FIG. 8 illustrates a configuration example of a network device of an embodiment. Only a structure for network synchronization is illustrated.

In FIG. 8, the network device 1 is connected to interface units (interface cards) 101A through 101C connected to external network devices 2A through 2C, respectively a controller 103 such as a central processing (CPU) unit, and a clock processor 107 which is connected to the interface units 101A through 101C and an external clock source 3 and generating a clock signal based on an inputted clock signal.

The interface unit 101A is connected to a network device 2A compliant with ATM and has functions such as clock extraction from the communication line and clock insertion to the communication line. The interface unit 101A includes a frame processing unit 102A for processing a Synchronization Status Message (SSM) in conformity with an S1 byte of OH bytes of SDH where ATM cells are mapped.

The interface unit 101B is connected to a network device 2B compliant with Ethernet and has functions such as clock extraction from the communication line and clock insertion to the communication line.

The interface unit 101B includes a frame processing unit 102B for processing a Synchronization Status Message (SSM) in conformity with an operation, and administration, maintenance (OAM) byte of Ethernet.

The operation, administration, and maintenance (OAM) byte is information included in maintenance and control function information of Ethernet in compliance with ITU-T Y.1731 and provides a function of confirming connectivity between network devices (e.g. ETH-CC (continuity check)), a function of confirming communications with a network device (e.g. ETH-LB (loopback)), and a function of confirming a route to a network device (e.g. ETH-LT (link trace)).

Figure 9:
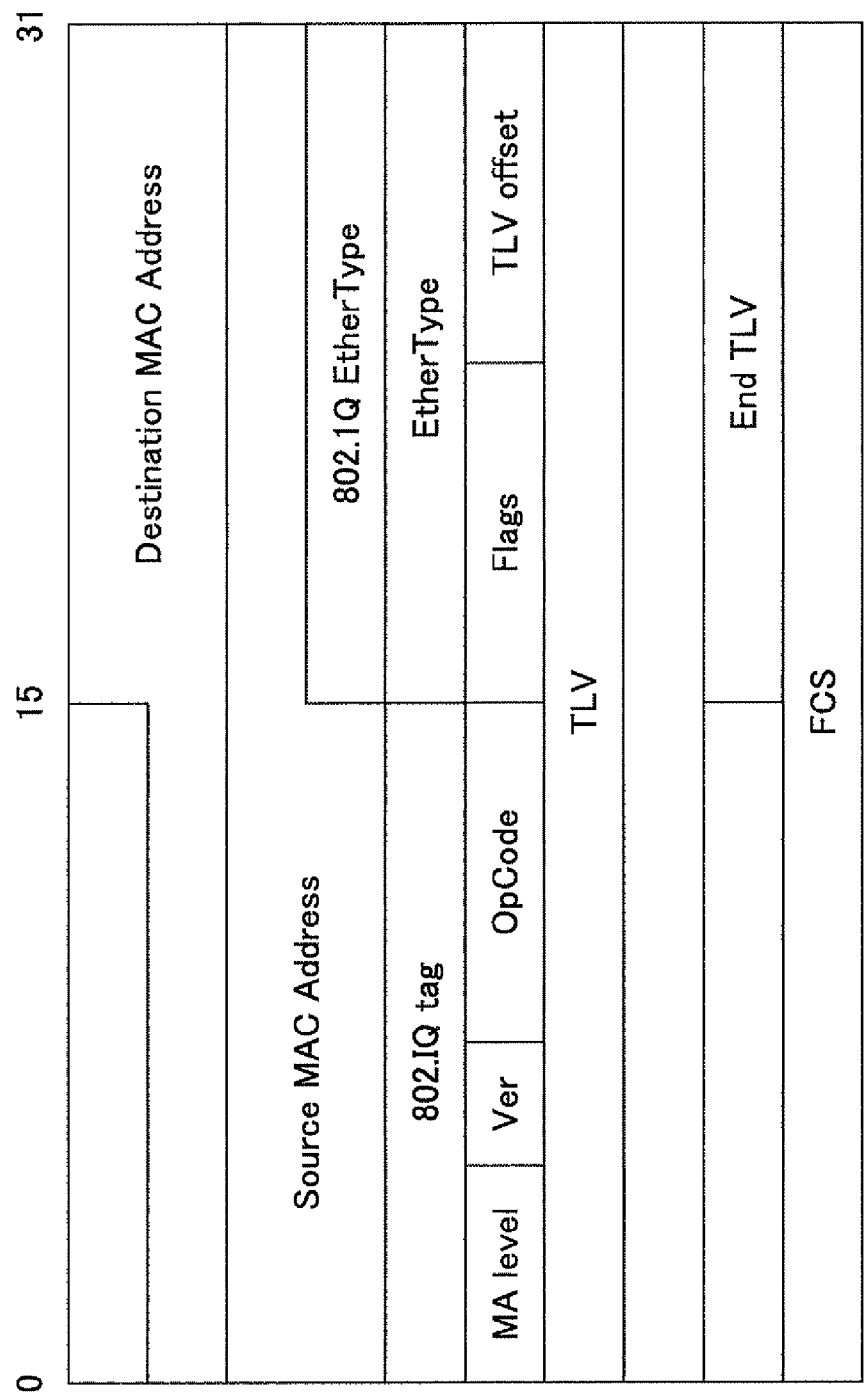
FIG. 9 illustrates an OAM frame structure of Ethernet.

FIG. 9 illustrates an operation, administration, maintenance (OAM) frame structure of Ethernet, and a part of type, length, and value (TLV) is an area to be mapped.

Referring back to FIG. 8, the interface unit 101C is connected to the network device 2C compliant with SONET or SDH, and has functions such as clock extraction from the communication line and clock insertion to the communication line.

The interface unit 101C includes a frame processing unit 102C for processing a Synchronization Status Message (SSM) in conformity with overhead (OH) byte of Ethernet.

The number of interface units and types of the connected devices are not so limited. Practically, the number of the interface units becomes several dozens.

The controller 103 includes a SSM processing unit (clock quality), a timing source selection unit 105 and an interface type recognition unit 106.

An SSM processing unit 104 carries out a clock quality control with a Synchronization Status Message (SSM) obtained while the SSM processing unit 104 communicates with frame processing units 102A through 102C of the interface units 101A through 101C and a PDH interface unit 110 of the clock processor 107.

A timing source selection unit 105 determines a clock used as a reference clock based on the clock quality determined by the SSM processing unit 104, and instructs the clock processor 107 to select the clock.

The interface type recognition unit 106 can determine communication line types (interface types) by communicating with the interface units 101A through 101C.

The clock processor 107 includes a controller interfacing unit 108, a digital signal processor (DSP) unit 109, the PDH interface unit 110, and a frequency measuring instrument 111. The clock processor 107 includes a band-pass filter 121, a frequency divider 122, a selector unit 123, a phase comparing unit 124, a digital filter unit 125, a digital filter setup unit 126, an oscillating unit 127, e.g. direct digital synthesizer (DDS), a frequency divider 128, and a distributor 129.

The controller interfacing unit 108 has functions of communicating with the controller 103.

The digital signal processing unit 109 communicates with the controller 103 via the controller interfacing unit 108 to control various portions of the clock processor 107 as clock controlling.

The PDH interface unit 110 is connected to the external clock source 3 to receive a clock signal in conformity with a PDH interface for supplying clock signals.

The frequency measuring instrument 111 receives extracted clock signals from the interface units 101A through 101C, a clock signal from the PDH interface unit 110, and a clock signal from a selector unit 123, and measures frequencies and frequency deviations of these clock signals using a reference clock source to determine the communication line type. An internal configuration of the frequency measuring instrument 111 will be described later. Results of measurement are stored in a measured result storing unit 118.

The extracted clock signals from the interface units 101A through 101C and the clock signal from the PDH interface unit 110 are subject to band-pass filtering with a band-pass filter 121 using a predetermined center frequency.

The center frequency is designated by the digital signal processing unit 109.

The frequency divider 122 divides a frequency of a clock signal that passes through the band-pass filter 121 at a predetermined frequency dividing ratio. The frequency dividing ratio is designated by the digital signal processing unit 109.

The selector unit 123 selects one of the clock signals which pass through the frequency divider 122. The clock signal is selected by an instruction from the digital signal processing unit 109.

A DPLL circuit is configured by a phase comparing unit 124, a digital filter unit 125, an oscillating unit 127, and a frequency divider 128.

The DPLL circuit is requested to determine a cutoff frequency in a relatively low frequency range to suppress jitter and wander caused in communication lines and transmitters and receivers, for example fc=0.1 Hz in SONET or SDH standard, and continuously outputs clock signals having an originally proper frequency even though the clock is switched over or broken down.

Therefore, it is necessary to support a hold over function of accurately reproducing reference clock signals and an internal mode of synchronizing a receiver compliant with Stratum3 equipped in the network device to realize the accuracy of Stratum3.

A transfer function is determined by a coefficient of the digital filter unit 125 of the DPLL circuit. The coefficient is ordinarily changed when a mode is changed from a fast pull-in mode to a normal mode in compliance with the ANSI standard.

The digital filter setup unit 126 sets filter parameters of the digital filter unit 125 based on the instruction from digital signal processing unit 109.

The distributor 129 divides the clock signals outputted from the oscillating unit 127 into a predetermined number (e.g. three in FIG. 8) and distributes the divided clock signals to the interface units 101A through 101C.

Figure 10:
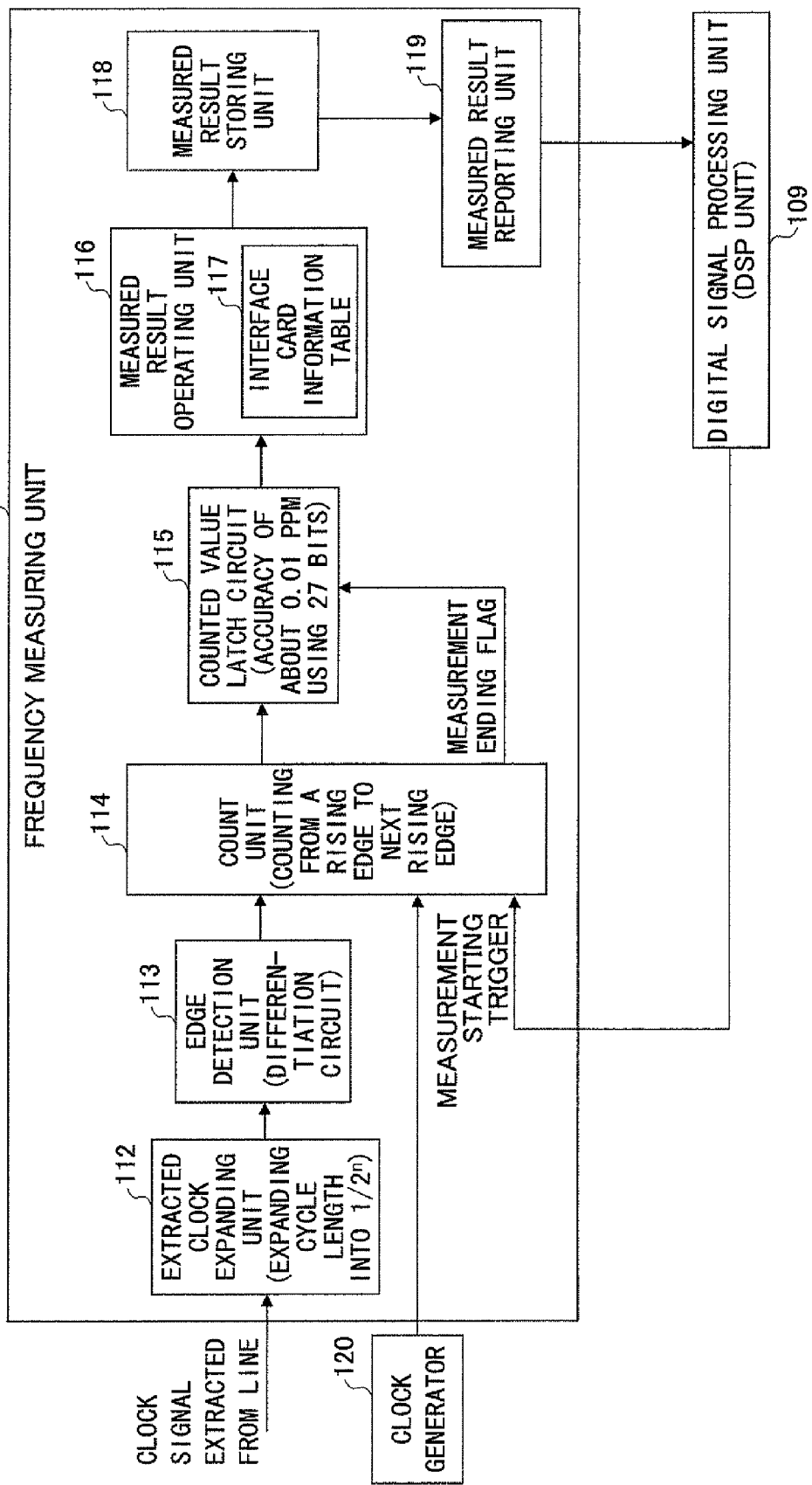
FIG. 10 illustrates a configuration example of a frequency measuring instrument.

FIG. 10 illustrates a configuration example of a frequency measuring instrument 111.

Referring to FIG. 10, the frequency measuring instrument 111 includes an extracted clock expanding unit 112, an edge detection unit (differentiating circuit) 113, a count unit 114, a counted value latch circuit 115, a measured result operating unit 116, a measured result storing unit 118, and a measured result reporting unit 119.

The extracted clock expanding unit 112 expands a cycle length of clock signals extracted from a communication line to make a frequency, for example, $\frac{1}{2}^n$ ($\frac{1}{2}$ raised to the nth power).

The edge detection unit 113 detects an edge, for example a rising edge, expanded by the extracted clock expanding unit 112. The frequency can be more accurately measured as the edge is expanded. However, a circuit scale and the amount of time to measure the edge also increase as the edge is expanded.

The count unit 114 counts the number of clock signals from the reference clock generator 120 from a rising edge to a subsequent rising edge based on edges detected by the edge detection unit 113. Because a clock frequency of the reference clock generator 120 is known, the number of the clock signals corresponds to a frequency of clock signals extracted from a communication line subject to the measurement. The count of the edges starts from an edge reaching immediately after receiving a measurement start trigger which is received by the count unit 114 from the digital signal processing unit 109. The count unit 114 outputs a measurement start flag indicative of count start and a measurement end flag indicative of count end.

The counted value latch circuit 115 takes a counted value in from the count unit 114 when the measurement end flag indicates an end of measurement.

The measured result operating unit 116 calculates a measured result based on the counted value taken in by the counted value latch circuit 115 and stores the calculated values in the measured result storing unit 118. The measured result includes a frequency, a frequency deviation, and a communication line type. The communication line type is determined using the interface card information table 117.

FIG. 11 illustrates an example of an interface card information table. Communication line types are associated with rates of clock signals extracted from communication lines in the interface card information table. The rates of clock signals extracted from the communication line is 12.96 MHz, obtained by dividing the transmission rates of SONET or SDH illustrated in FIG. 1 into four.

Further, since the clock rate of PDH corresponds to DS1 frame of SONET (ANSI), the rate of clock signal extracted from the communication line is 12.96 MHz. Since the clock rate of SDH (ETSI) corresponds to E1 frame of SONET (ANSI), the rate of clock signal extracted from the communication line is 2.048 MHz.

Communication line speeds of Ethernet are 10 Mbps, 100 Mbps, 1 Gbps, 10 Gbps, and 100 Gbps. Rates of clock signals extracted from Ethernet are 25 MHz, 50 MHz, and 125 MHz.

The measured result operating unit 116 searches for a rate of a clock signal extracted from the communication line in the interface card information table 117 in consideration of error in the measured frequency. The communication line type and the rate of the clock signal extracted from the communication line corresponding to the measured frequency are determined. The frequency deviation is obtained by statistically processing the measured frequency.

Referring back to FIG. 10, the measured result reporting unit 119 notifies the digital signal processing unit 109 of the measured result stored in the measured result storing unit 118. FIG. 12 illustrates an example of a data structure of measured results. The data structure includes communication line type information, frequency information, frequency deviation information, and requisite characteristic information. Others are information kept in reserve.

The communication line type information is typically coded as follows.
000: SONET/SDH
001: PDH (ANSI)
010: PDH (ETSI)
100: Ether (10/100ME)
101: Ether (1GE)
110: Ether (10GE)

The frequency information is typically coded as follows.
000: 12.96 MHz (SONET/SDH SONET or SDH)
001: 1.544 MHz (pdh(ANSI))
010: 2.048 MHz (pdh(ETSI))
100: 25 MHz (Ether(10/100ME))
101: 100 MHz (Ether(1GE))
110: 125 MHz (Ether(10GE))

The requisite characteristic information is typically coded as follows.
00: Stratum3
01: Stratum3E
10: Ether SYNC <Operation: Network Synchronization>

Referring to FIG. 8, the frame processing unit 102A of the interface unit 101A determines a quality level of clock signals based on an S1 byte of OH bytes of SDH where ATM cells received from the communication line from the network device 2A compliant with ATM are mapped. The SSM processing unit 104 of the controller 103 acquires the quality level.

The frame processing unit 102B of the interface unit 101B determines a quality level of clock signals based on an OAM byte from the communication line connected to the network device 2B. The SSM processing unit 104 of the controller 103 acquires the quality level.

The timing source selection unit 105 of the controller 103 determines a clock having a highest quality among the qualities of interface units 101A through 101C acquired by the SSM processing unit 104 as a timing source, and instructs selection of the clock signal to the clock processor 107.

The clock signals extracted from the communication lines connected to interface units 101A through 101C and the clock signal from the PDH interface unit 110 are inputted in selector unit 123 sequentially via the band-pass filter 121 and the frequency divider 122.

When the digital signal processing unit 109 receives the instruction of selecting a clock from the timing source selection unit 105 via the controller interfacing unit 108, the digital signal processing unit 109 controls the selector unit 123 to select the clock.

Thus, the clock signal having the highest quality among the clock signals extracted from the communication lines via the interface units 101A through 101C and the clock signal from the PDH interface unit 110 is inputted in the DPLL circuit.

As described below, the frequency divider 122 divides the frequency of an output clock signal from the frequency divider 122 itself to be a predetermined clock rate irrespective of communication line types.

In the DPLL circuit, the phase comparing unit 124 compares a phase of the clock signal inputted from the selector unit 123 and a phase of a clock signal obtained by dividing the clock signal output from the oscillating unit 127 by frequency divider 128. A signal corresponding to a phase difference is given to the oscillating unit 127 via the digital filter unit 125 as a control signal.

The control signal functions to converge the phase difference to a predetermined value. Therefore, even if the phase difference initially exists, the phase difference is gradually reduced. When the pull-in is completed and the DPLL circuit is locked, a phase of an output clock signal from the selector unit 123 and a phase of an output signal from the frequency divider 128 are the same.

Output clock signals from the oscillating unit 127 are synchronized with the reference clock, distributed by the distributor 129, and sent to the interface units 101A through 101C so as to be used in communication lines bound for the network device 2A through 2C. Thus, network synchronization is realized.

<Operation: Frequency Dividing Setup and Filter Parameter Setup>

Figure 13:
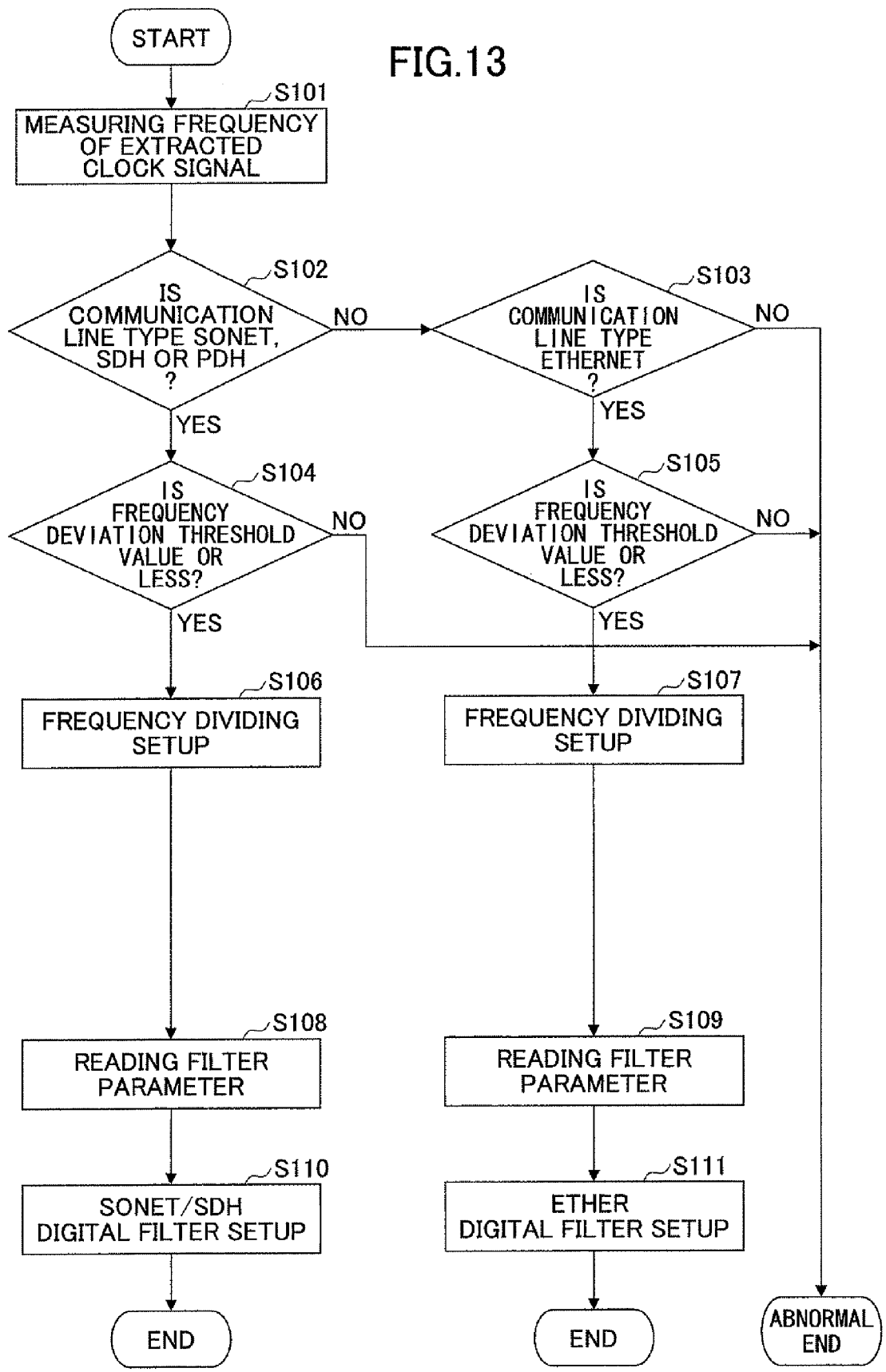
FIG. 13 is a flow chart of an example of frequency dividing setup and filter parameter setup.

FIG. 13 is a flow chart of an example of frequency dividing setup and filter parameter setup.

In FIG. 13, the frequency measuring instrument 111 of the clock processor 107 measures a frequency of a clock signal selected by the selector unit 123 and notifies measured results including a communication line type to the digital signal processing unit 109 (Step S101).

The digital signal processing unit 109 determines whether the communication line type included in the measured results is a communication line type of SONET, SDH or PDH in Step S102. When the communication line type included in the measured results is not the communication line type of SONET, SDH or PDH (NO in Step S102), it is determined whether the communication line type included in the measured results is a communication line type of Ethernet in Step S103. When it is determined that the communication line type included in the measured results is not the communication line type of Ethernet (NO in Step S103), the process is completed by determining that the communication line type included in the measured results is not compliant.

When it is determined that the communication line type included in the measured results is a communication line type of SONET, SDH or PDH (YES in Step S102), or a communication line type of Ethernet (YES in Step S103), it is determined whether frequency deviations of the measured results are within predetermined threshold values in Steps S104 and S105. When it is determined that the frequency deviations are not within the predetermined threshold values (NO in Step S104 and NO in Step S105), the communication line type included in the measured results cannot be used. Therefore, the process is completed.

When it is determined that the frequency deviation of the measured results is within a predetermined threshold value (YES in Step S104 and YES in Step S105), the digital signal processing unit (DSP unit) 109 carries out the frequency dividing setup for the frequency divider 122 (Steps S106 and S107).

FIG. 14 illustrates an example of frequency dividing setup. The digital signal processing unit 109 stores information of frequency dividing ratios corresponding to communication line types. The frequency dividing ratio corresponding to the communication line type included in the measured results measured by the frequency measuring instrument 111 is acquired and provided in the frequency dividing ratio frequency divider 122.

In FIG. 14, the clock signals of the communication lines are divided to a predetermined reference frequency of 8 kHz regardless of the communication line types.

The two clocks input into the phase comparing unit 124 has 8 kHz under a locked state. However, because there is the frequency divider 128, an output clock from the oscillating unit 127 is, for example, 3.24 MHz.

Referring back to FIG. 13, the digital signal processing unit 109 reads out filter parameters for optimizing the digital filter unit 125 in Steps S108 and S109. The digital filter setup unit 126 provides the filter parameters to the digital filter unit 125 in Steps S110 and S111. Thus, the process ends.

FIG. 15 illustrates an example of filter parameter setup. The digital signal processing unit 109 stores information of filter parameters corresponding to communication line types, acquires filter parameters $\alpha$ and $\beta$ corresponding to the communication line type included in the measured results measured by the frequency measuring instrument 111, and provides the filter parameters $\alpha$ and $\beta$ to the digital filter unit 125.

Figure 16:
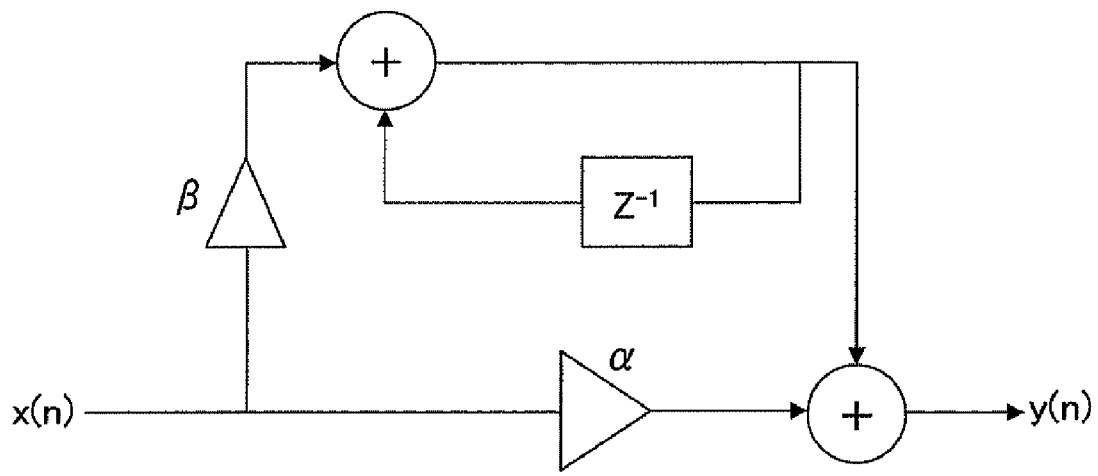
FIG. 16 is a schematic view explaining filter parameters.

The filter parameters $\alpha$ and $\beta$ correspond to an amplification of an amplifier in the circuit configuration of the digital filter unit 125 illustrated in FIG. 16.

The filter parameters $\alpha$ and $\beta$ are calculated to satisfy a target cutoff frequency (FC), a target locking time, and a target damping factor. The target cutoff frequency is a cutoff frequency for suppressing jitter and wander caused at a moderate cycle length. The target locking time is a locking time operationally admissible until a pull-in is completed.

FIG. 17 illustrates an example of setup information sent from a digital signal processing unit 109 to a digital filter setup unit 126. The setup information includes a filter parameter α, a filter parameter β, a cutoff frequency, and a damping factor.

When the filter parameters α and β are applied without change, the cutoff frequency and the damping factor are unnecessary. A reason why the cutoff frequency and the damping factor are included is to match a method of calculating the filter parameters α and β on a side of the digital filter setup unit 126.

By automatically carrying out the frequency dividing setup and the optimum value setup of filter parameters, it is possible to flexibly deal with plural communication lines types having different frequencies, and clean up extracted clock signals having different qualities so as to have similar qualities. Therefore, it is possible to take Ethernet having insufficient clock signal quality in a network by suppressing jitter and wander.

<Operation: Information Notification to Controller>

By the above-mentioned filter parameter setup, the digital filter unit 125 is set to have the optimum value corresponding to the communication line type. Simultaneously, a locking time until the DPLL circuit finishes the pull-in changes. Particularly, when a clock from Ethernet having insufficient clock quality is selected as a reference clock, the locking time is prolonged because a cutoff frequency is low (for example 0.01 Hz) to suppress jitter or wander.

Ordinarily, the controller 103 inquires the digital signal processing unit 109 via the controller interfacing unit 108 whether the DPLL circuit finishes the pull-in to monitor the pull-in. Until it is confirmed that the pull-in is finished, other processes cannot be sufficiently carried out. Therefore, a time of monitoring the pull-in is prolonged and prevents the other processes from being carried out.

In this embodiment, a predicted locking time until the pull-in is finished is calculated or acquired and reported to the controller 103 when the filter parameters of the digital filter unit 125 are set. By this, it is sufficient for the controller 103 to determine whether the pull-in is finished after a lapse of the reported locking time (the predicted locking time). Therefore, load on the controller 103 is decreased, and software can be simplified and become more efficient.

Figure 18:
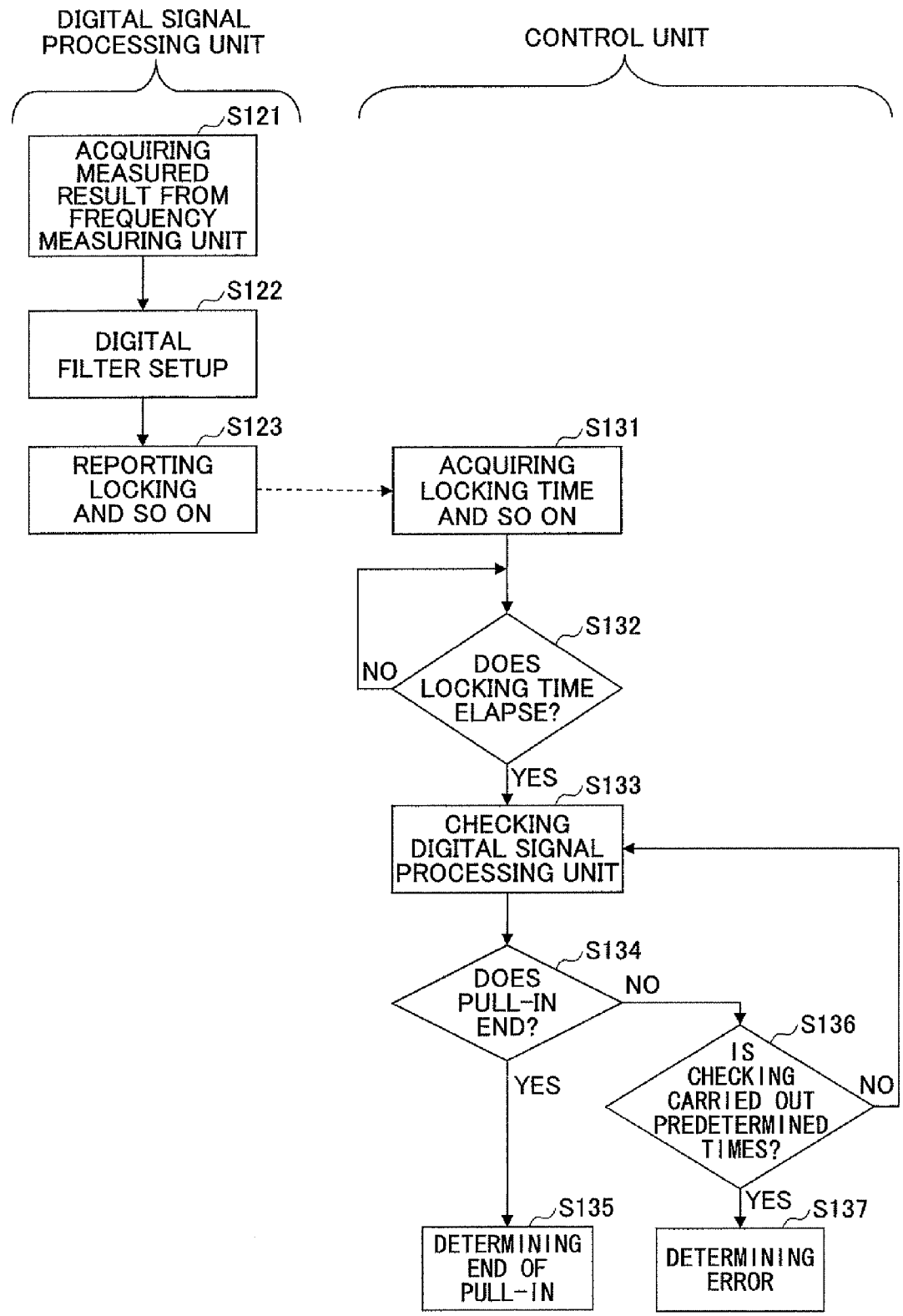
FIG. 18 is a flow chart illustrating an example of information notice to a controller.

FIG. 18 is a flow chart illustrating an example of an information notice to a controller 103.

Referring to FIG. 18, the digital signal processing unit 109 acquires measured results from the frequency measuring instrument 111 in step S121, and provides filter parameters to the digital filter unit 125 in step S122. Thereafter, the digital signal processing unit 109 calculates or acquires a locking time of the DPLL circuit and reports information including the locking time to the controller 103 via the controller interfacing unit 108 in step S123. FIG. 19 illustrates an example of reported information sent from the digital signal processing unit 109 to the controller 103. The reported information includes a communication line type, a locking time and a cutoff frequency.

Referring back to FIG. 18, the controller 103 acquires information including the locking time from the digital signal processing unit 109 via the controller interfacing unit 108 in step S131. Then, it is periodically checked whether the locking time is finished in step S132.

When it is determined that the locking time is finished (YES in step S132), the controller 103 confirms the digital signal processing unit 109 via the controller interfacing unit 108 whether it is in a status indicating that the pull-in is finished in step S133.

The digital signal processing unit 109 determines that the pull-in in the DPLL circuit has been finished when an output from the phase comparing unit 124 is stabilized during predetermined cycle lengths. The digital signal processing unit 109 replies to the controller 103 that the pull-in is finished when it is queried by the controller 103.

The controller 103 determines whether the pull-in in the DPLL circuit is finished based on the reply of the digital signal processing unit 109 in step S134. When it is determined that the pull-in is finished (YES in step S134), The controller 103 ends the process in step S135.

Meanwhile, when it is determined that the pull-in is not finished (NO in step S134), it is determined whether a number of times confirming the status indicating that the pull-in is finished to the digital signal processing unit 109 exceeds a predetermined number of times (for example three times) in step S136. When the number is less than the predetermined times (NO in step S136), controller 103 repeats to confirm the status indicating that the pull-in is finished.

When the number of times confirming the status with the digital signal processing unit 109 is the predetermined times or more (YES in step S136), it is determined that an error occurs and the process ends in step S137.

FIG. 18 illustrates a mode in which the controller 103 queries the digital signal processing unit 109 whether the pull-in is finished. However, it is also possible to positively report to the controller 103 when the DPLL circuit finishes the pull-in from the digital signal processing unit 109. This notification can be attained by giving an interrupt processing function from the digital signal processing unit 109 to the controller 103.

Second Embodiment

<Operation: Setting Filter Parameters Controlled by the Controller>

In the First Embodiment, the clock processor 107 autonomously sets the filter parameters of the digital filter unit 125. However, in the Second Embodiment, the controller 103 arbitrarily instructs a locking time and a cutoff frequency to the digital signal processing unit 109 based on quality information of clock signals collected by the SSM processing unit 104. The digital filter unit 125 sets filter parameters upon the request of the controller 103 to provide a controllable configuration.

For example, when it is required to transit to a normal mode after finishing pull-in within a locking time for the pull-in of one minute or less, the controller 103 determines setting of the digital filter unit 125 to do so. Then, a mode of considering a start-up time can be realized.

This is a method effective when a high quality clock signal can be acquired from SONET or SDH or even from Ethernet. Said differently, in a case where quality control using an S1 byte of SONET or SDH or quality control using an OAM byte of Ethernet is used and an extremely high quality message is notified, the controller 103 is structured to instruct the digital signal processing unit 109 to set the digital filter so as to shorten a locking time.

Figure 20:
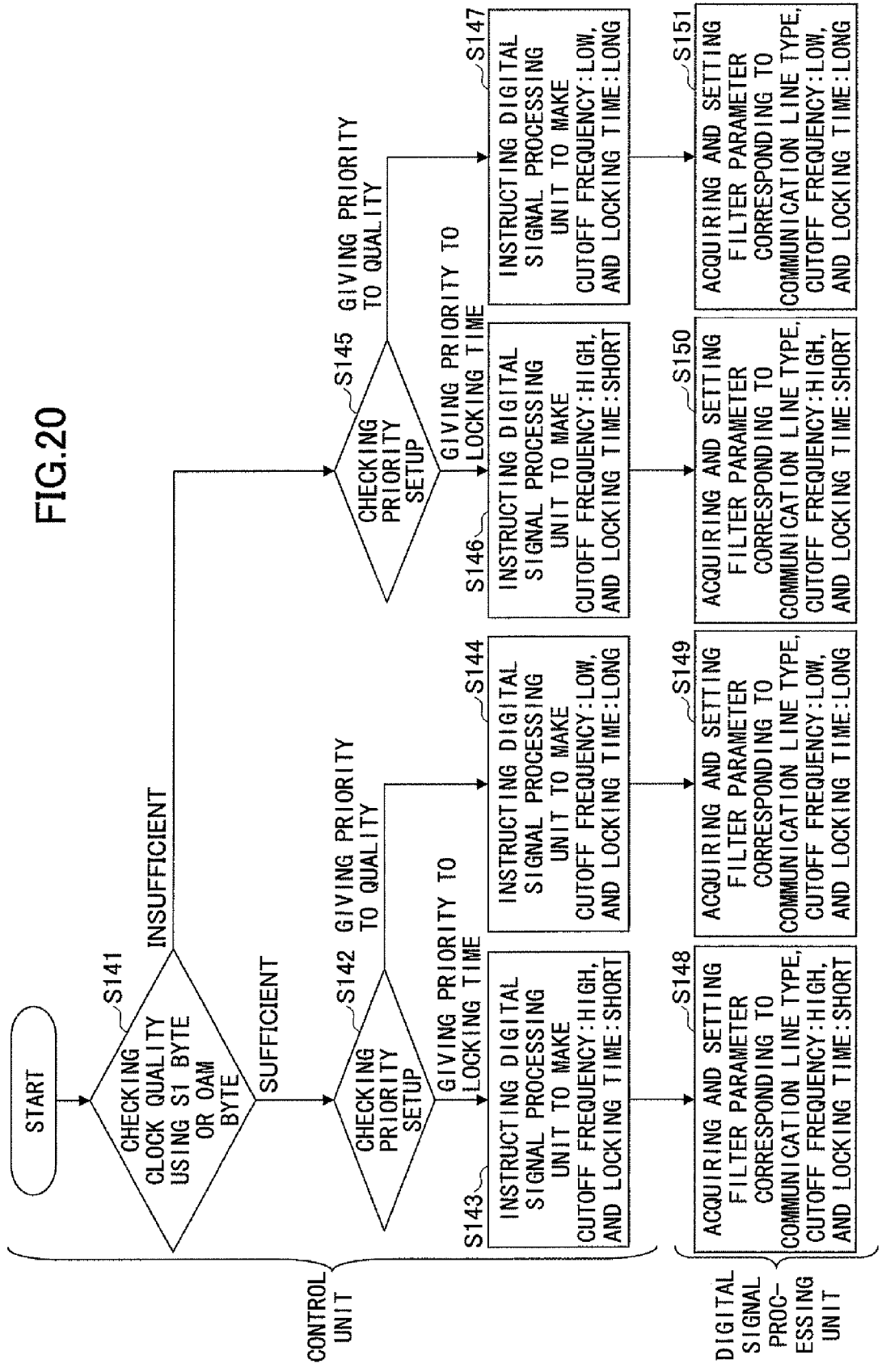
FIG. 20 is a flow chart illustrating an example of filter parameter setup controlled by a controller.

FIG. 20 is a flow chart illustrating an example of filter parameter setup controlled by the controller 103.

Referring to FIG. 20, the controller 103 determines clock quality based on an S1 byte or an OAM byte acquired by SSM processing unit 104 from frame processing units 102A through 102C of the interface units 101A through 101C in step S141.

When the quality is sufficient, priority setup set by a administrator in advance is checked to determine whether a locking time is prioritized or quality is prioritized in step S142. When the locking time is prioritized, the digital signal processing unit 109 is instructed to increase a cutoff frequency and shorten the locking time in step S143. When the quality is prioritized, the digital signal processing unit 109 is instructed to decrease a cutoff frequency and prolong the locking time in step S144.

Meanwhile, when the clock quality based on an S1 byte or an OAM byte is insufficient, the priority set up by the administrator in advance is checked by querying at the controller 103 to determine whether the locking time is prioritized or the quality is prioritized in step S145.

When the locking time is prioritized, the digital signal processing unit 109 is instructed to increase the cutoff frequency and shorten the locking time in step S146. When the quality is prioritized, digital signal processing unit 109 is instructed to decrease a cutoff frequency and prolong the locking time in step S147.

FIG. 21 illustrates an example of an instruction sent from the controller 103 to the digital signal processing unit 109. The instruction includes a locking time and a cutoff frequency.

Referring back to FIG. 20, when the digital signal processing unit 109 receives an instruction from the controller 103, filter parameters satisfying an instructed cutoff frequency and an instructed locking time corresponding to communication line type are acquired or calculated. The digital signal processing unit 109 provides the filter parameters to the digital filter unit 125 via the digital filter setup unit 126 in steps S148 through S151.

Candidates of the filter parameters are stored with respect to each communication line type illustrated in FIG. 15, for example. By selecting from the candidates of the filter parameters based on an instruction from the controller 103, the filter parameters can be selected as required. On the other hand, the filter parameters can be directly calculated using the cutoff frequency and the locking time instructed by the controller 103.

<Operation: Band-pass Filter Control>

Although the digital filter unit 125 is set to have an optimum value corresponding to a communication line type by the above-mentioned filter parameter setup, a reference clock contained in the DPLL circuit may include leap of frequency (frequency jump). In this case, the digital filter unit 125 may not thoroughly control. Especially, a clock signal extracted from Ethernet ordinarily has many frequency jumps that make quality of the clock signal insufficient. Such frequency jumps elongate a pull-in time for the DPLL circuit and affect clock generation.

In the embodiment, measurement results obtained by the frequency measuring instrument 111 are statistically processed, and a central frequency of the band-pass filter 121 positioned after the interface unit is controlled to thereby effectively remove jitter and wander. By doing this, it is possible to set the digital filter unit 125 in the DPLL positioned after the band-pass filter 121 so that the locking time is shortened.

Figure 22:
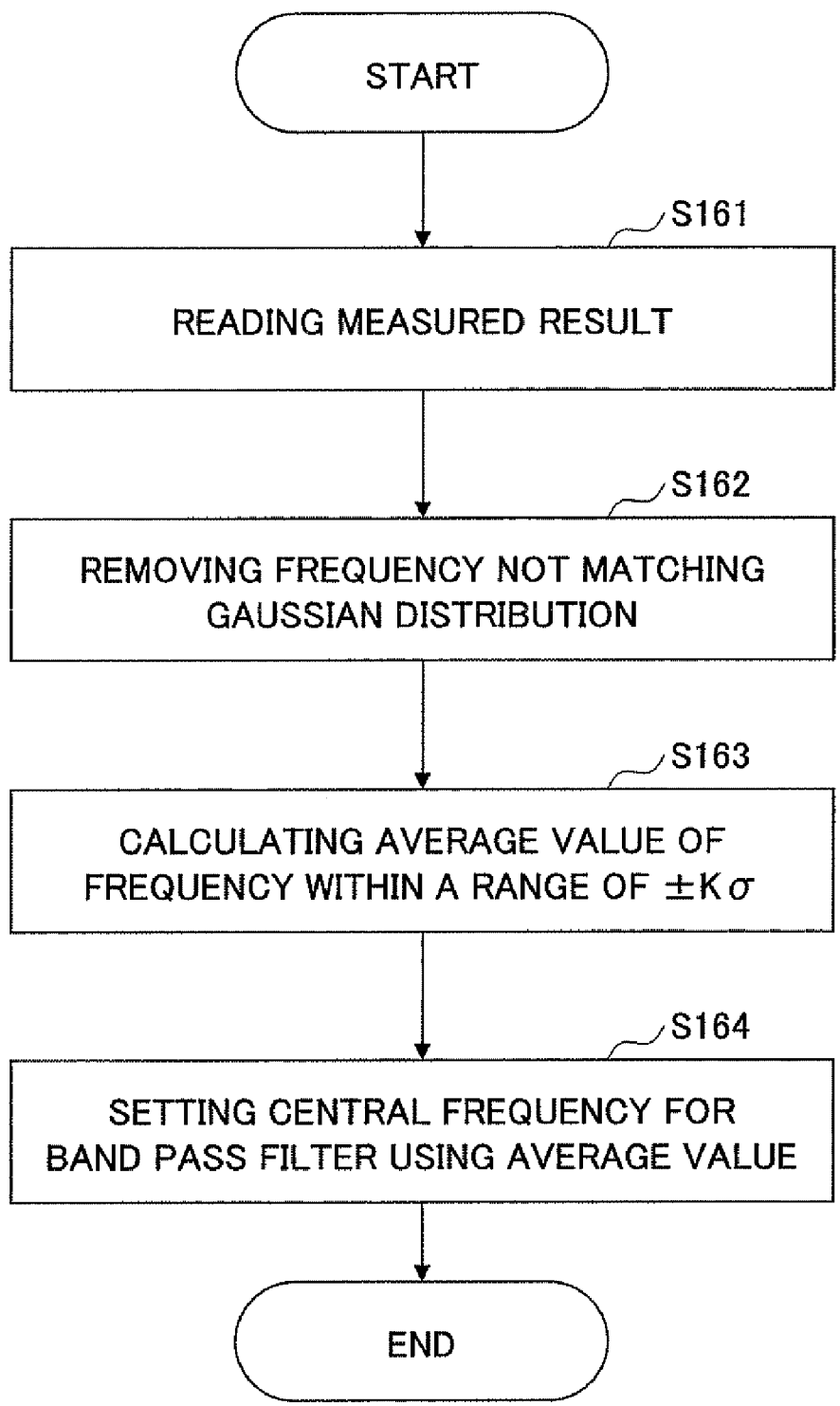
FIG. 22 is a flow chart illustrating an example of controlling a band-pass filter.

FIG. 22 is a flow chart illustrating an example of controlling a band-pass filter.

Referring to FIG. 22, the digital signal processing unit 109 reads out the measured results of frequencies from a measured result storing unit 118 of the frequency measuring instrument 111 in step S161. The digital signal processing unit 109 obtains variance of the measured results and removes frequencies which do not match a Gaussian distribution (standard distribution) in step S162. Thus, the measured results having extraordinary frequency jump are removed and components of jitter or wander are removed.

Figure 23:
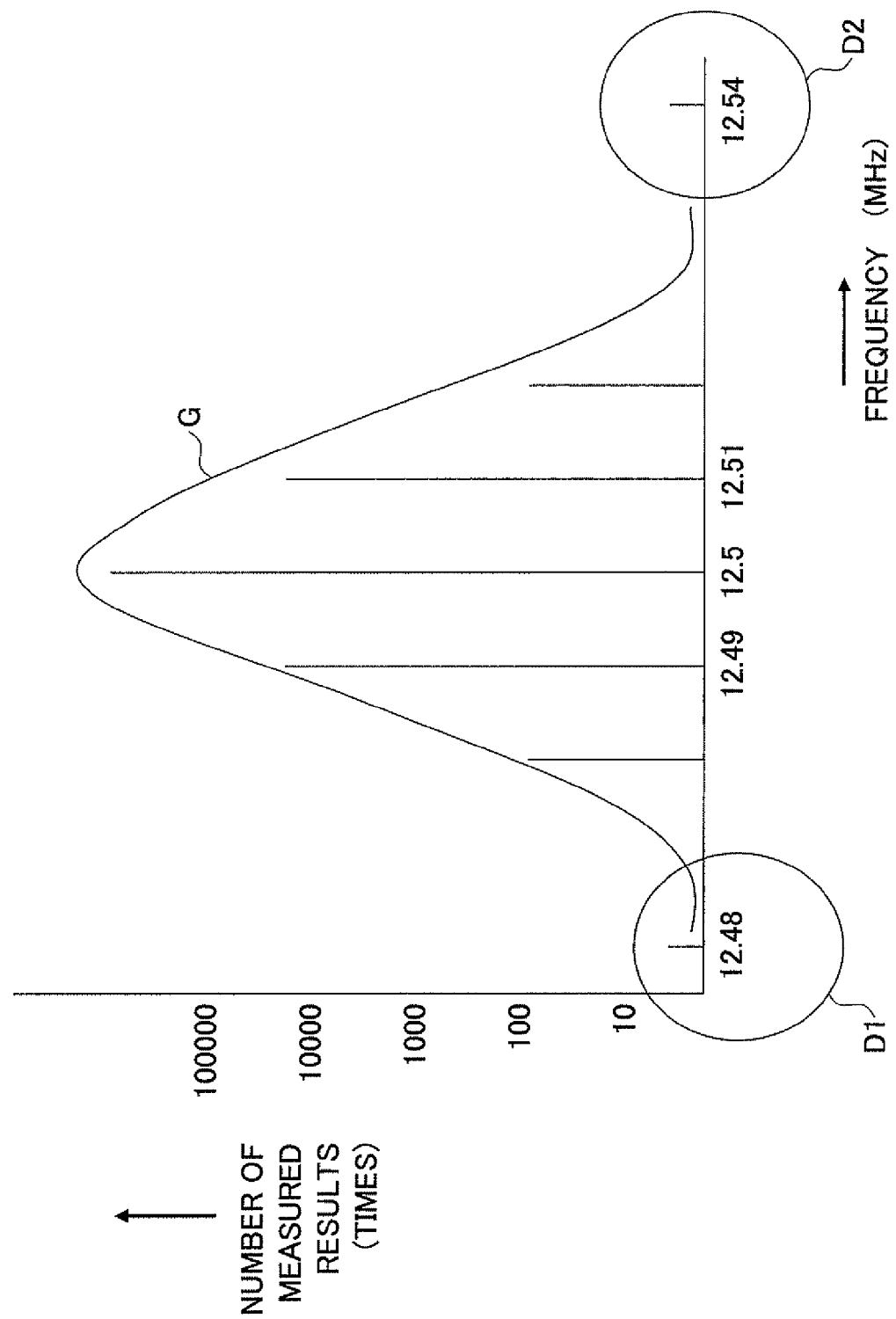
FIG. 23 illustrates an example of a measured frequency.

FIG. 23 illustrates an example of a measured frequency. The abscissa axis represents frequencies and the axis of ordinate represents number of measured results. As illustrated in FIG. 23, the Gaussian distribution curve is lapped over the measured results. Then, unmatched frequencies D1 and D2 are removed.

Referring back to FIG. 22, an arbitrary coefficient K is used and an average within a range of $\pm K\sigma$ is calculated in step S163. When a chance variable x follows $N(\mu, \sigma^2)$, a probability that a deviation from the average $\mu$ is within a range of $\pm 1\sigma$ is 68.26%, a deviation from the average $\mu$ is within a range of $\pm 2\sigma$ is 95.44%, and a deviation from the average $\mu$ is within a range of $\pm 3\sigma$ is 99.74%. Therefore, it is possible to obtain a central frequency having high accuracy when K=3 and a range of $\pm 3\sigma$ from the average is averaged out.

Then, the digital signal processing unit 109 provides the above-mentioned central frequency to the band-pass filter 121 in step S164.

<Operation: Detection of Miss-mount of Interface Card>

The interface units 101A through 101C are mounted on the network device 1 as interface cards. Ordinarily, communication line types correspond to card slots. However, miss-mount may occur such that an interface card not permitted for a communication line type is mounted in a card slot.

In the past, the interface type recognition unit 106 of the controller 103 communicates with an interface card (any one of interface units 101A through 101C) to determine an interface type and a communication line type when the interface card is mounted. Thus, the miss-mount is checked for and various initial settings are carried out.

In the embodiment, miss-mount of an interface card can be immediately detected using frequencies obtained by the frequency measuring instrument 111 without the above-mentioned check by the controller 103.

The frequency measuring instrument 111 can measure frequencies with high accuracy even though a circuit size is small, depending on setting and the circuit configuration.

Ordinarily, SONET or SDH is multiplexed using a minimum unit (51.84 MHz) called STS1 as a base unit. For example, the minimum unit (51.84 MHz) is divided into four, and the divided frequency (12.96 MHz) is used as timing of a communication line.

The frequency measuring instrument 111 has a function of monitoring a frequency deviation of Stratum3 standard, which is minimally conforming. This function can be used to extract a frequency deviation between a communication line timing of SONET or SDH of 12.96 MHz and a communication line timing of Ethernet of, for example, 12.5 MHz FIG. 24 is a flow chart illustrating an example of miss-mount of an interface card.

Figure 24:
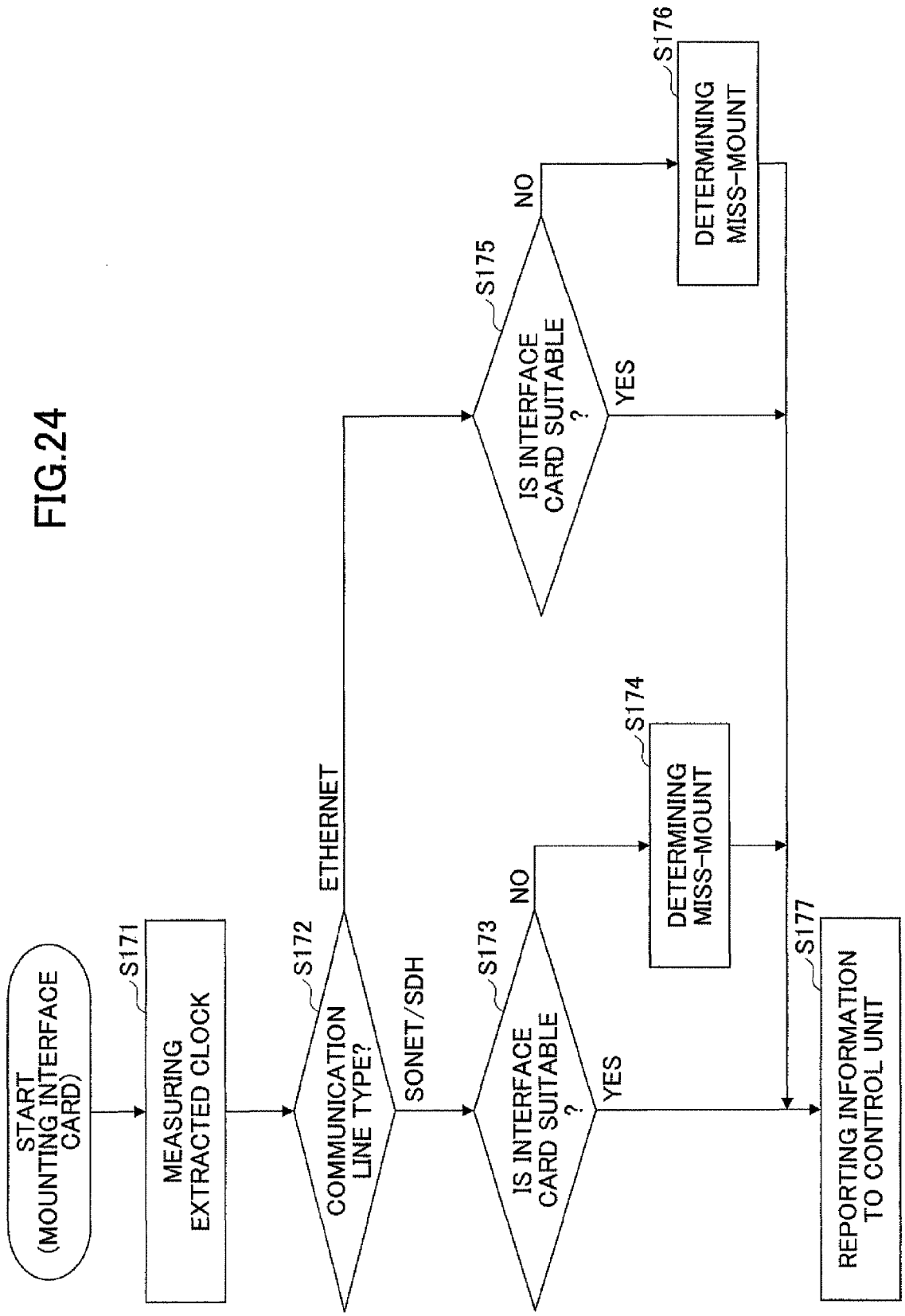
FIG. 24 is a flow chart illustrating an example of miss-mount of an interface card.

Referring to FIG. 24, the clock processor 107 starts a process after an interface card is mounted. Then, the frequency measuring instrument 111 measures clock signals extracted from a communication line in step S171, and determines the communication line type in step S172.

When the communication line type is SONET or SDH, it is determined whether the interface card and the corresponding communication line type are suitable for a card slot in step S173. When the interface card and the corresponding communication line type are not suitable for the card slot, miss-mount of the interface card is determined in step S176.

Meanwhile, when the communication line type is Ethernet, it is determined whether the interface card and the corresponding communication line type are suitable for a card slot in step S175. When the interface card and the corresponding communication line type are not suitable for the card slot, miss-mount of the interface card is determined in step S176.

The frequency measuring instrument 111 reports the determination to the controller 103 via the digital signal processing unit 109 in step S177. FIG. 25 illustrates an example of information thus reported. The information includes communication line type information, frequency information, frequency deviation information and miss-mount information.

The controller 103 thus reported sets a network system corresponding to the interface card in a case other than the miss-mount. In a case of the miss-mount, it is reported to an administrator with an alarm lamp such as a LED.

As described above, the network device of the embodiment can be flexibly applied to plural communication line types and can establish a synchronized network of Ethernet like a synchronized network of SONET or SDH.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network device comprising:
a plurality of interface cards that receive clock signals and clock signal quality information via communication lines, the communication lines being of predetermined communication line types corresponding to the plurality of interface cards, respectively;
a controller that acquires the clock signal quality information from the plurality of interface cards, determines one of the clock signals having a highest quality based on the clock signal quality information and instructs a clock processor to select the determined one of the clock signals; and
the clock processor that generates a synchronization clock signal used for network synchronization with a DPLL (Digital Phase Locked Loop) circuit, which is included in the clock processor, based on the determined one of the clock signals,
wherein the clock processor comprises:
a frequency measuring instrument that measures a frequency component of the one of the clock signals, and determines the communication line type corresponding to one of the plurality of interface cards receiving the determined one of the clock signals; and
a clock controller that provides a coefficient to a digital filter included in the DPLL circuit based on the determined communication line type.

2. The network device according to claim 1,
wherein the clock processor carries out frequency dividing setup for a frequency divider based on the determined communication line type to make uniform clock rates of the clock signals.

3. The network device according to claim 1,
wherein the clock controller selects the coefficient of the digital filter based on the determined communication line from candidate coefficients stored in association with the communication line types, and provides the selected coefficient to the digital filter in the DPLL circuit.

4. The network device according to claim 1, wherein the clock controller sends a cutoff frequency and a damping factor to the digital filter, and the digital filter recalculates the coefficient based on the cutoff frequency and the damping factor.

5. The network device according to claim 1,
wherein the clock processor calculates a predicted locking time required until the DPLL circuit finishes pull-in after the clock controller provides the coefficient to the digital filter and reports the predicted locking time to the controller.

6. The network device according to claim 1,
wherein after the clock controller provides the coefficient to the digital filter and the DPLL circuit finishes the pull-in, the clock processor reports the controller that the pull-in is finished.

7. The network device according to claim 1,
wherein the controller sends a limit value of the coefficient to the clock controller, and the clock processor sets the coefficient based on the limit value instead of the determined communication line type.

8. The network device according to claim 1,
wherein the clock processor obtains a central frequency of measured results of the frequency component measured by the frequency measuring instrument after obtaining a variance of the measured results and removing the frequency component which does not match a Gaussian distribution from the measured results, and provides the obtained central frequency to a band pass filter positioned between the plurality of interface cards and the DPLL circuit.

9. The network device according to claim 1,
wherein the frequency measuring instrument measures frequency components of the clock signals received by the plurality of interface cards that are positioned at predetermined interface card positions in the network device respectively, and determines the communication line types corresponding to the plurality of interface cards receiving the clock signals, and the clock processor compares designed communication line types designed for the predetermined interface card positions with the determined communication line types corresponding to the plurality of interface cards, and reports an occurrence of miss-mount to the controller when at least one of the designed communication line types is different from a corresponding one of the determined communication line types.

10. A network synchronization clock controlling method for a network device including a plurality of interface cards that receive clock signals and clock signal quality information via communication lines, the communication lines being of predetermined communication line types corresponding to the plurality of interface cards respectively, a controller that acquires the clock signal quality information from the plurality of interface cards, determines one of the clock signals having a highest quality based on the clock signal quality information, and instructs a clock processor to select the determined one of the clock signals; and the clock processor that generates a synchronization clock signal used for network synchronization with a DPLL (Digital Phase Locked Loop) circuit, which is included in the clock processor, based on the determined one of the clock signals, the controlling method comprising: measuring a frequency component of the one of the clock signals; determining the communication line type corresponding to one of the plurality of interface cards receiving the one of the clock signals; and providing a coefficient to a digital filter included in the DPLL circuit based on the determined communication line type.

11. The network synchronization clock controlling method for the network device according to claim 10,
wherein the clock processor carries out frequency dividing setup for a frequency divider based on the determined communication line type to make uniform clock rates of the clock signals.

12. The network synchronization clock controlling method for the network device according to claim 10,
wherein the clock controller selects the coefficient of the digital filter based on the determined communication line from candidate coefficients stored in association with the communication line types, and provides the selected coefficient to the digital filter in the DPLL circuit.

13. The network synchronization clock controlling method for the network device according to claim 10, wherein the clock controller sends a cutoff frequency and a damping factor to the digital filter, and the digital filter recalculates the coefficient based on the cutoff frequency and the damping factor.

14. The network synchronization clock controlling method for the network device according to claim 10,
wherein the clock processor calculates a predicted locking time until the DPLL circuit finishes pull-in after the clock controller provides the coefficient to the digital filter and reports the predicted locking time to the controller.

15. The network synchronization clock controlling method for the network device according to claim 10,
wherein after the clock controller provides the coefficient to the digital filter and the DPLL circuit finishes the pull-in, the clock processor reports the controller that the pull-in is finished.

16. The network synchronization clock controlling method for the network device according to claim 10,
wherein the controller sends a limit value of the coefficient to the clock controller, and the clock processor sets the coefficient based on the limit value instead of the determined communication line type.

17. The network synchronization clock controlling method for the network device according to claim 10,
wherein the clock processor obtains a central frequency of results of the frequency component measured by the frequency measuring instrument after obtaining a variance of the results and removing the frequency component which does not match a Gaussian distribution, and provides the obtained central frequency to a band pass filter positioned between the plurality of interface cards and the DPLL circuit.

18. The network synchronization clock controlling method for the network device according to claim 10,
wherein the frequency measuring instrument measures frequency components of the clock signals received by the plurality of interface cards that are positioned at predetermined interface card positions in the network device respectively, and determines the communication line types corresponding to the plurality of interface cards receiving the clock signals, and the clock processor compares designed communication line types designed for the predetermined interface card positions with the determined communication line types corresponding to the plurality of interface cards, and reports an occurrence of miss-mount to the controller when at least one of the designed communication line types is different from a corresponding one of the determined communication line types.

* * * * *